Oct. 27, 1970    A. LEDERGERBER    3,535,962
MULTIPLE-SPINDLE MACHINE TOOL
Filed Sept. 29, 1967    6 Sheets-Sheet 2

Inventor:
Alfred Ledergerber
By Michael S. Striker
Attorney

Oct. 27, 1970     A. LEDERGERBER     3,535,962
MULTIPLE-SPINDLE MACHINE TOOL
Filed Sept. 29, 1967     6 Sheets-Sheet 6
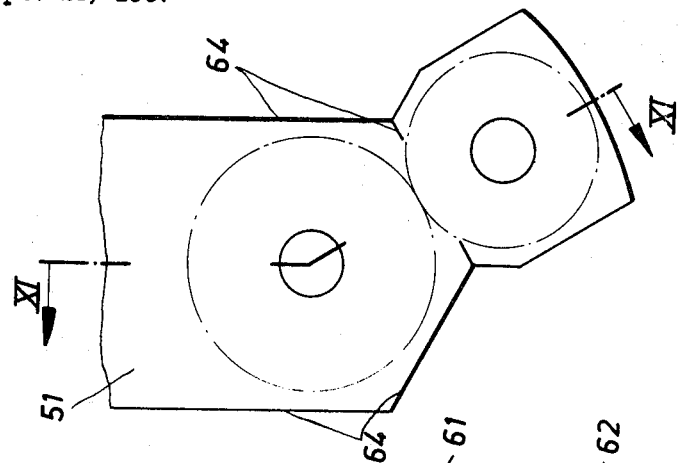
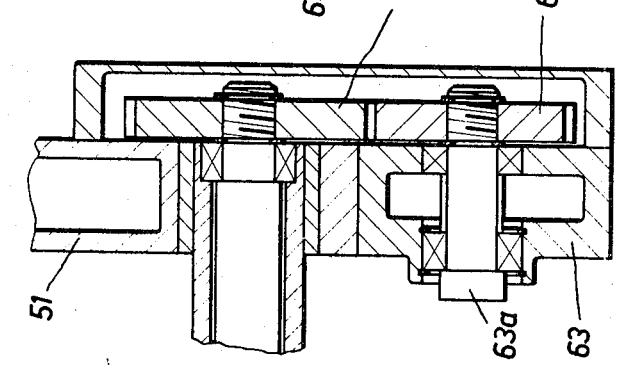
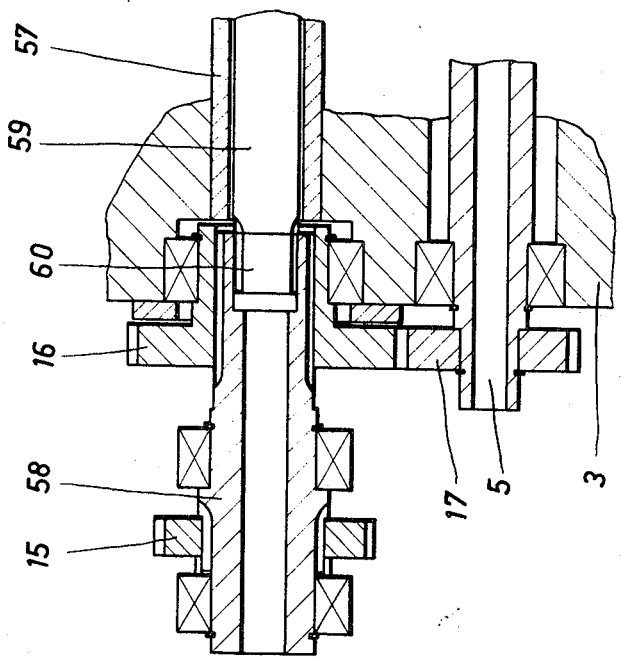
*Inventor:*
Alfred Ledergerber
By
*Attorney*

United States Patent Office 3,535,962
Patented Oct. 27, 1970

3,535,962
MULTIPLE-SPINDLE MACHINE TOOL
Alfred Ledergerber, Bielefeld, Germany, assignor to Werkzeugmaschinenfabrik Gildemeister & Comp., Akt.-Ges., Bielefeld, Germany
Filed Sept. 29, 1967, Ser. No. 671,691
Claims priority, application Germany, Oct. 5, 1966, W 45,520
Int. Cl. B23b 9/00
U.S. Cl. 82—3  9 Claims

ABSTRACT OF THE DISCLOSURE

An automatic multiple-spindle chucking or bar machine wherein the work- and tool-accommodating space is fully open at the front side of the frame and also from below. The guide for the main slide is hollow and accommodates an auxiliary shaft which can drive one or more attachments connectable with an overhanging portion of the frame which extends from the headstock above the space for workpieces and tools and accommodates the main control spindle. The drive for the work spindles is short and its prime mover is installed behind the headstock for the spindle carrier opposite the work-supporting ends of the spindles. The main control shaft drives a series of camshafts each of which can drive a cross slide or a top slide as well as an auxiliary shaft serving to transmit rotary, pivotal, reciprocatory and/or other motion to one or more attachments.

BACKGROUND OF THE INVENTION

The present invention relates to machine tools in general, and more particlarly to improvements in multiple-spindle machine tools. Still more particularly, the invention relates to horizontal chucking or bar machines with an indexible carrier for a set of work spindles which are suited for treatment of workpieces in rapid sequence with very short dwells between successive indexing movements of the spindle carrier.

Presently known multiple spindle chucking or bar machines normally comprise a frame which defines a completely enclosed work- and tool-accommodating space, particularly as seen in the longitudinal direction of the machine. The power train which drives the work spindles is very long and the prime mover for the spindles is remote from the spindles; as a rule, the prime mover is located at that side of the frame which faces away from the aforementioned space. The power train includes a main drive shaft which extends through the spindle carrier and supports the main tool slide. The cross slides receive motion through a system of cams, links, levers and rods from the prime mover for the spindles. The frames of just described conventional machines are rather sturdy because their parts fully enclose the work- and tool-accommodating space; however, such sturdiness is achieved at the expense of accessibility to the working stations and reduces the volume of the aforementioned space. This presents several problems if the machine is to use plural attachments and particularly as regards rapid insertion, interchange or replacement of tools, tool holders, slides, cams and/or workpieces. Furthermore, there is little room for controlled and rapid evacuation of shavings which are removed from workpieces. Moreover, the fact that the power train between the work spindles and the prime mover is very long also causes a number of problems because the parts of the power train are likely to vibrate, to produce excessive noise and to undergo excessive wear if they must be started and arrested at frequent and rapidly following intervals prior and subsequent to rapid acceleration to a high speed which is necessary in rapid treatment of workpieces. The inertia of cross slides, top slides and other relatively heavy parts which receive motion during each stage of a working cycle also contributes to undesirable wear and prevents accurate machining of workpieces at rapidly following intervals. Also, the inertia of heavy parts affects the control shaft wrich transmits motion to special attachments and other motion receiving devices in a multiple-spindle chucking or bar machine.

SUMMARY OF THE INVENTION

One of several objects of my present invention is to provide a multiple-spindle machine tool with a system of drives and motion transmitting units whose inertia is small so that they can transmit motion at frequent intervals and permit rapid acceleration and/or deceleration of driven parts.

Another object of the invention is to provide a novel frame for a multiple-spindle machine and to construct and assemble the essential and optional parts of the machine in such a way that they can be readily reached, inspected, cleaned, interchanged and/or removed with little loss in time.

A further object of the invention is to provide a machine wherein the evacuation of shavings can be carried out with greater facility than in presently known multiple-spindle machine tools.

An additional object of the invention is to provide a multiple-spindle machine tool which is particularly suited for short-lasting treatment of extruded or press-formed workpieces and wherein the removal of shavings does not interfere with accessibility and/or operation of various tools or attachments.

A concomitant object of the invention is to provide simple and lightweight auxiliary drives for attachments which receive rotary, reciprocatory, pivotal and/or other motion from the main control shaft of a multiple-spindle bar or chucking machine and to assemble such auxiliary drives of a small number of parts.

My invention is embodied in a multiple-spindle machine tool whose frame defines a work- and tool-accommodating space which is fully open toward the front side of the frame and from below. The power train for the work spindles is short and its prime mover is disposed at that side of the headstock for the indexible spindle carrier which faces away from the aforementioned space. The main control shaft is horizontal and is mounted in an overhanging portion of the frame which is connected with the headstock and extends above the space. This overhanging portion supports one end of the guide for the main tool slide and can carry one or more special attachments.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 9 is a fragmentary vertical sectional view as seen in the direction of arrows from the line IX—IX of FIG. 2;

FIG. 10 is an enlarged end elevational view of an attachment which is connected to an overhanging portion of the frame, the view being taken in the direction of arrow X shown in FIG. 1; and FIG. 11 is a section as seen in the direction of arrows from the line XI—XI of FIG. 10.

DESCRIPTION OF THE PREFERRED EMBODIMENTS

Figure 1:
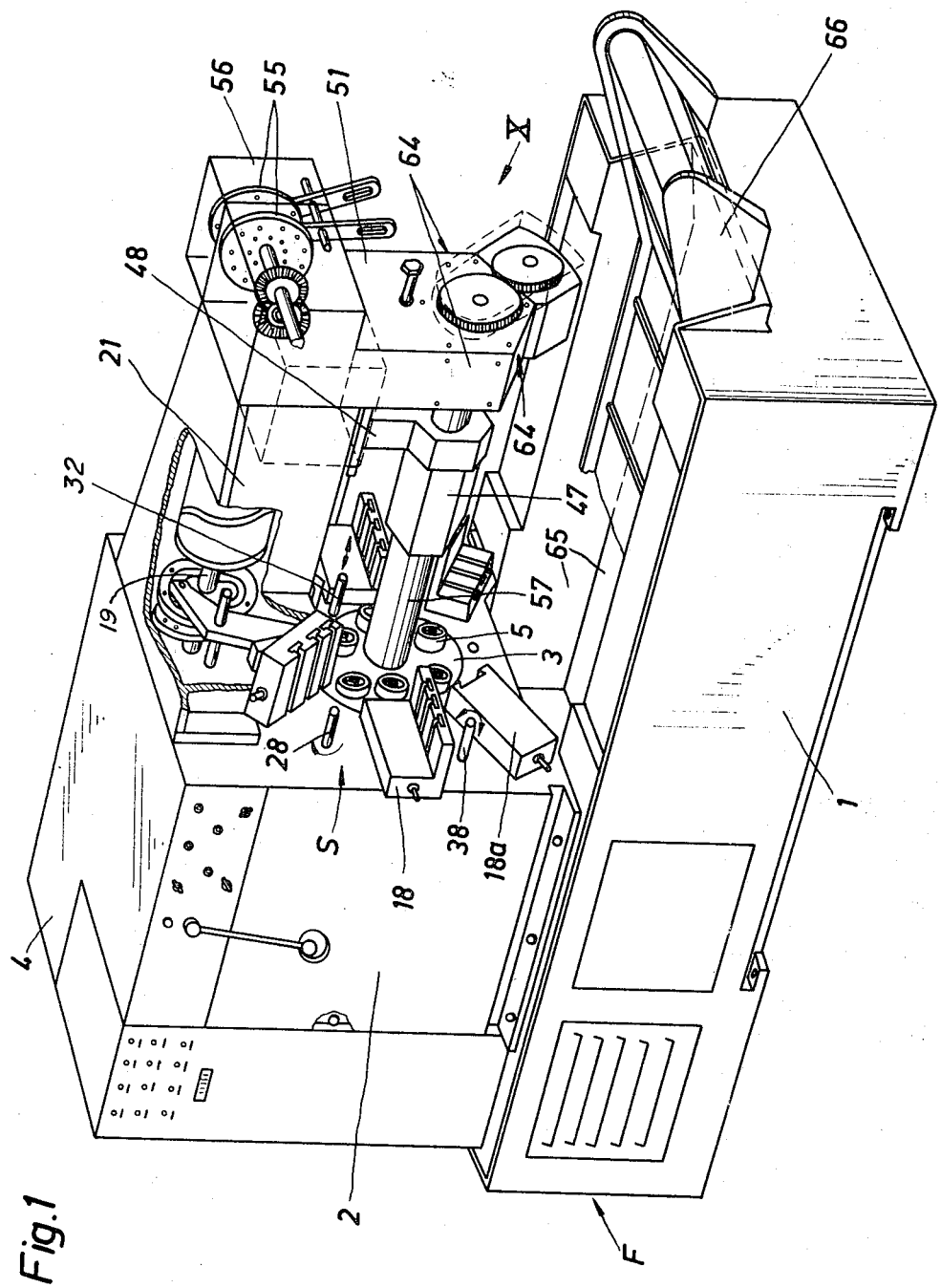
FIG. 1 is a perspective view of a multiple-spindle machine tool which embodies one form of my invention, a portion of the frame being broken away directly above the work-accommodating space.
Figure 2:
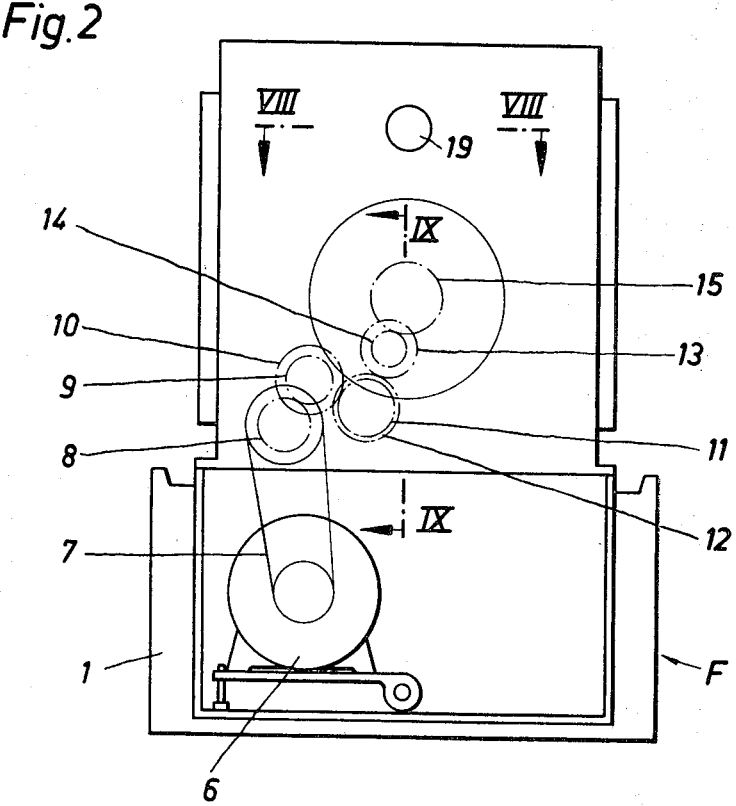
FIG. 2 is an end elevational view of the machine tool as seen from the left-hand side of FIG. 1 and illustrates certain components of the drive for the work spindles.

Referring first to FIGS. 1 and 2, there is shown an automatic multiple spindle machine tool which comprises a frame F including a casting 1 forming a base or bed and supporting an upright support of headstock 2 which accommodates a rotary indexible carrier 3 for six equidistant work spindles 5. The mount 4 for the power train of the drive for the spindles 5 in the carrier 3 is bolted to or integral with that side of the headstock 2 which faces away from the working station. This insures that the carrier 3 and spindles 5 can be indexed and rotated by a very short power train. The prime mover 6 of the drive is preferably constituted by an electric motor which is mounted on the bed 1 and transmits motion through a belt drive 7, a transmission including a gear train 8 to 15 in the mount 4 (see particularly FIG. 3), and a planetary including a sun wheel 16 and planet pinions 17. The pairs of meshing gears 10, 11 and 12, 13 are readily accessible and replaceable to change the transmission ratio.

Figure 4:
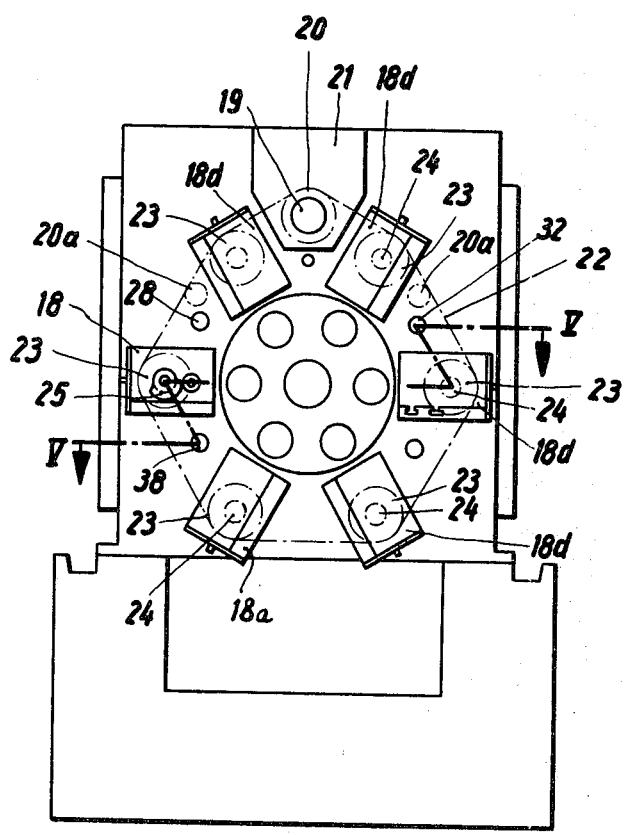
FIG. 4 is an end elevational view of the headstock with cross and top slides.
Figure 5:
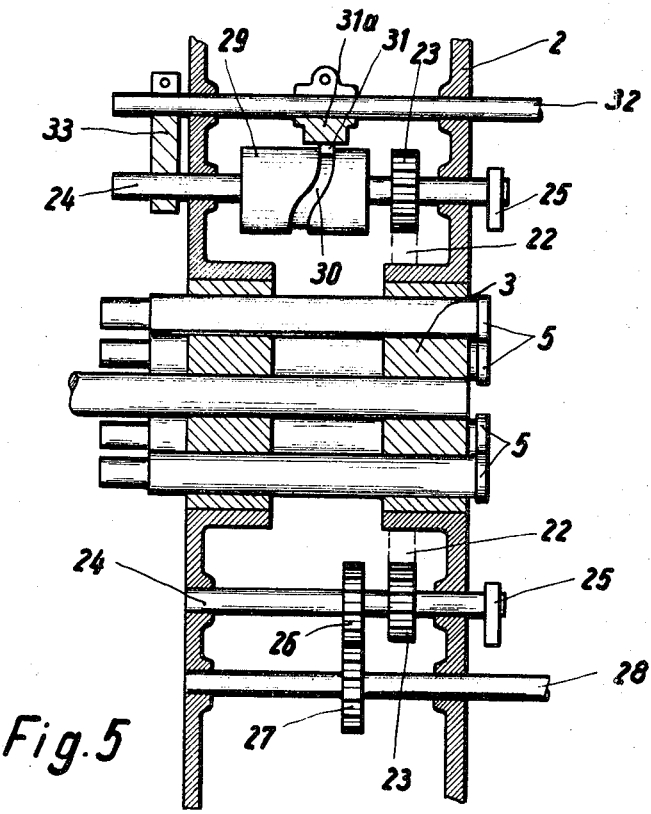
FIG. 5 is a horizontal sectional view of the headstock as seen in the direction of arrows from the line V—V of FIG. 4, showing two types of drives for auxiliary shafts.

The machine tool further comprises one or more cross slides, for example, two cross slides 18, 18a, which receive motion in a manner as illustrated in FIGS. 4 and 5. A horizontal main camshaft or control shaft 19 which is mounted in the frame F at a level above the carrier 3 is provided with a driver gear 20 which drives an endless chain 22. This chain can be replaced by a ring gear (not shown) surrounding the spindle carrier 3 and in mesh with the driver gear 20. The chain 22 can be tensioned by means of two tensioning rolls 20a mounted on the headstock 2 and movable radially with reference to the axis of the carrier 3. The chain 22 is trained around driven gears 23 which are affixed to secondary camshafts 24 for the cross slides and each of which preferably comprises the same number of teeth as the driver gear 20. Each secondary camshaft 24 carries an exchangeable cam 25 serving to transmit motion to a cross slide. The cross slides 18, 18a are of different design (see FIG. 1) so that each thereof can carry one or more different tool holders for material removing tools. These cross slides are exchangeable and can be mounted at different locations, i.e., adjacent to the work-supporting ends of selected spindles 5. FIG. 4 shows a total of six cross and top slides including the slides 18, 18a and four slides 18d but the number of these slides can be less, depending on the desired number of operations to which the workpieces are subjected during a complete cycle. The cross slide 18a is flat and is designed to receive and to retain a tool holder at one of its ends, i.e., adjacent to the work-supporting end of the respective spindle 5. The cross slide 18 is L-shaped and is designed to carry tool holders at several distances from the work-supporting end of the adjoining spindle 5. Other types of cross slides can be employed with equal advantage and each of the illustrated cross slides can switch positions with any one of the other five cross and top slides.

As shown in FIG. 5, the control shaft 19 can transmit motion to one or more attachments. One of the shafts 24 carries a cylindrical cam 29 having an endless peripheral cam groove 30 which receives a roller follower 31 installed in a bearing member 31a which is affixed to a reciprocable auxiliary shaft 32 mounted in the headstock 2. When the control shaft 19 drives the gear 20, it also drives the cam 29 whereby the follower 31 causes the auxiliary shaft 32 to move back and forth and to operate an attachment whose operation necessitates a reciprocatory movement. An arm 33 holds the shaft 32 against rotational movement. The right-hand end portion of the shaft 32 extends beyond the right-hand side of the headstock 2 (see FIG. 1).

The secondary camshaft 24 shown in the lower part of FIG. 5 carries a driver gear 26 meshing with a driven gear 27 on a second auxiliary shaft 28 which transmits rotary motion to another attachment. Since the gear 23 on the secondary camshaft 24 has the same number of teeth as the driver gear 20 on the control shaft 19, the auxiliary shaft 28 can be rotated at the same speed as the control shaft, at a higher speed or at a lower speed but always proportionally to the speed of the control shaft. It is clear that the gear 26 can be mounted directly on the control shaft 19, that the cam 29 can be mounted on one of the secondary camshafts 24, or that each camshaft can carry a cam or gear to transmit motion to a suitable attachment. The right-hand end portion of the auxiliary shaft 28 extends beyond the right-hand side of the headstock and can be coupled to an attachment which must receive rotary motion.

Figure 6:
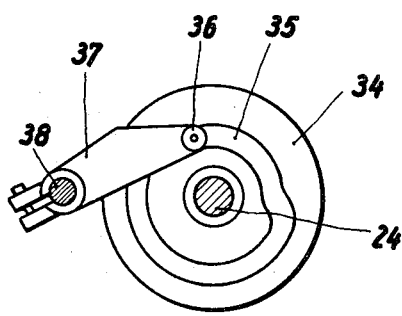
FIG. 6 is a fragmentary sectional view of a third drive for an auxiliary shaft.

FIG. 6 shows that a secondary camshaft 24 can also support a face cam 34 having an endless cam groove 35 machined into one of its end faces and accommodating a roller follower 36 mounted on an arm 37 which is affixed to an auxiliary shaft 38 serving to pivot or oscillate a further attachment. Thus, the control shaft 19 and/or one or more secondary camshafts 24 can operate attachments which require rotary, reciprocatory and/or pivotal movement for their operation. The three motion transmitting structures of FIGS. 5 and 6 can be installed in a fully assembled machine tool having the basic design of FIG. 1 or they may be permanently or removably or exchangeably installed during initial assembly of the machine tool. Thus, the cams 29, 34 and the gear 26 can be removed or interchanged so that each attachment can be installed in any one of several possible positions to remove material from succesive workpieces at one of the six working stations adjacent to the illustrated end of the carrier 3 shown in FIG. 1. The dimensions (or at least the diameters) of the auxiliary shafts 32, 28, 38 are preferably identical so that each thereof can be installed in either one of several sets of bearings or journals provided therefor in or on the headstock 2. One end portion of the auxiliary shaft 38 extends from the headstock and can be coupled to an attachment.

Figure 7:
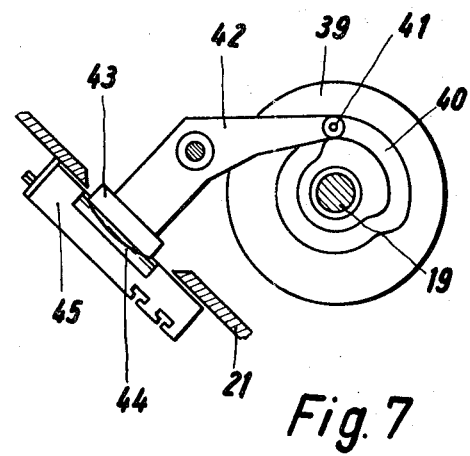
FIG. 7 is a similar fragmentary sectional view of a fourth drive for an auxiliary shaft which can be used to transmit motion to a heavy top slide.
Figure 8:
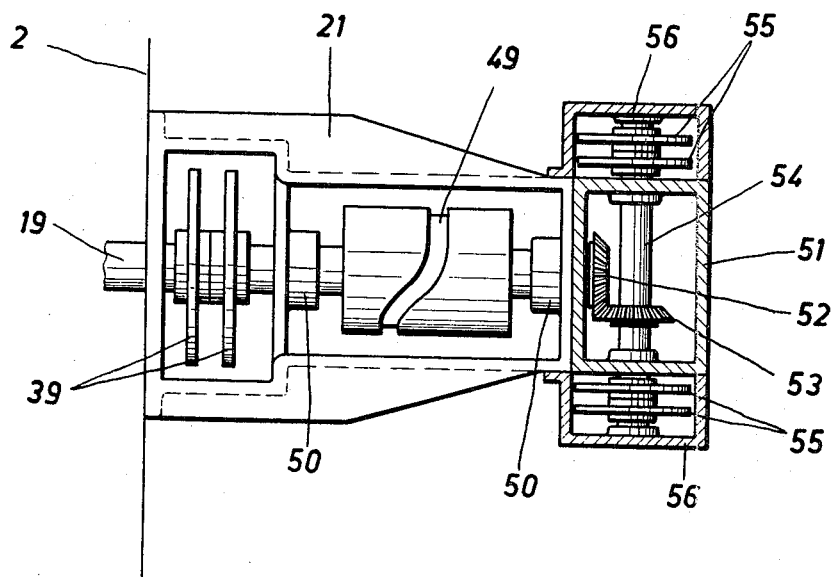
FIG. 8 is an enlarged horizontal sectional view substantially as seen in the direction of arrows from the line VIII—VIII of FIG. 2.

A relatively heavy top slide or cross slide 45 (see FIG. 7) which can be used to carry a tool holder for tools which remove material from workpieces held in one of the two uppermost spindles 5 shown in FIG. 1 can receive motion from an auxiliary drive which includes a rotary face cam 39 having an endless cam groove 40 for a roller follower 41 mounted on a two-armed lever 42 having a toothed segment 43. The top slide 45 is mounted on an elongated overhanging extension or arm 21 which is bolted to or is integral with the headstock 2 and extends above the space S for the workpieces and tools. The segment 43 meshes with a rack 44 on the top slide 45 and transmits to the latter a reciprocatory movement in response to oscillatory movement of the lever 42. The arm 21 can support two top slides 45. The cam 39 is mounted directly on the control shaft 19 which extends through the arm 21. FIG. 8 shows that the control shaft 19 can carry two cams 39, one for each of the two top slides mounted on the arm 21. However, it is clear that all of the six cross and top slides shown in FIG. 1 can be mounted on the headstock 2 and that the cams 39 can be dispensed with.

The main or longitudinal tool slide 47 of my improved machine tool is movable by a carriage 48 (FIG. 1) which receives motion from a cylindrical cam 49 mounted on the control shaft 19 (see FIG. 8). The roller follower which extends into the endless circumferential groove of the cam 49 and is affixed to the main slide 47 is not shown in the drawing. The just mentioned follower can also be affixed to a spindle (not shown) which is connected to the carriage 49 and is reciprocable in the arm 21. Such spindle can be mounted in the arm 21 at a level above the slide 47 and below the cam 49. The arm 21 carries bearings 50 for the control shaft 19 and the latter's right-hand end portion extends into a hollow bearing block 51 and carries a bevel gear 52 meshing with a bevel gear 53 on a transverse horizontal second control shaft 54. The bearing block 51 is mounted on or is integral with the free end of the arm 21. The end portions of the second control shaft 54 extend into a pair of housings 56 provided on the block 51 and carry pairs of cams 55 each of which can transmit motion to a further attachment (not shown). The bevel gear 52 and the parts receiving motion therefrom are preferably removable, i.e., the entire structure shown at the left-hand end of the arm 21 in FIG. 8 can be installed on an operative machine. As a rule, the second control shaft 54 will be fully assembled with and in the parts 51, 53, 55, 56 and such assembly can be bolted to or detached from the arm 21.

Figure 3:
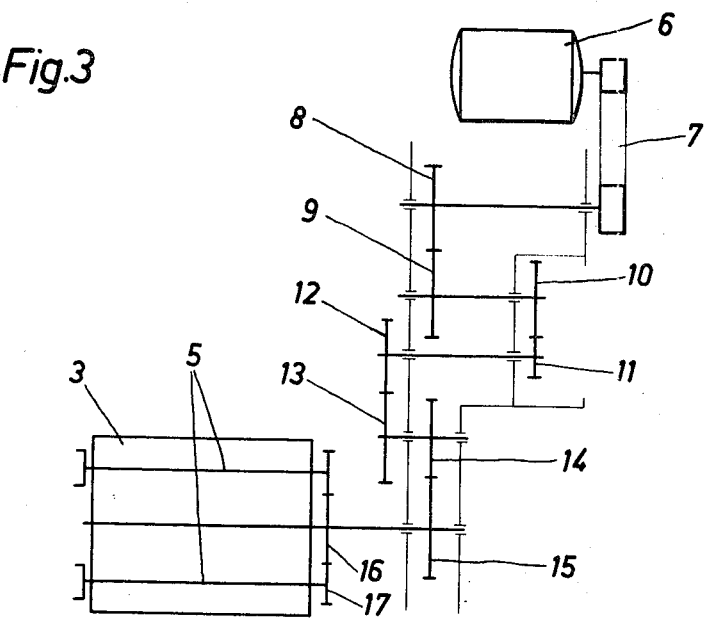
FIG. 3 is a diagrammatic side elevational view of the drive for the work spindles.

The main slide 47 can support one or more additional attachments which can be operated in synchronism with the work spindles 5 or at a predetermined ratio to the speed of these spindles. FIGS. 9 to 11 illustrate one of the attachments which can be mounted on the main slide 47. The gear 15 and sun wheel 16 of FIG. 3 are mounted on on hollow main drive shaft 58 (FIG. 9) having an internally splined end portion 60 adjacent to the corresponding end of the carrier 3. This splined end portion 60 can reeive the externally splined end of an auxiliary shaft 59 which can be inserted into a hollow cylindrical guide or sleeve 57. The latter extends through the carrier 3 and its other end is installed in the bearing block 51 (see FIG. 11). The right-hand end of the auxiliary shaft 59 carries a gear 61 meshing with a gear 62 on the input shaft 63a of an attachment 63. The casing of the attachment 63 can be bolted to one of several facets 64 at the lower end of the bearing block 51 (see FIG. 10). The attachment 63 may constitute a high-speed drilling or boring machine and its input member 63a may but need not rotate at the exact speed of the main drive shaft 58. The gears 61, 62 are accessible to change the ratio between the shaft 59 and input member 63a. It is further clear that the gears 61, 62 can be replaced by a variable-speed transmission and that the motion transmitting connection between the attachment 63 and main drive shaft 58 may include one or more clutches so that the attachment 63 can remain mounted on the frame F but is disconnected during certain types of operations. The same applies for the previously described attachments each of which can be provided with a clutch and/or with a variable-speed transmission.

FIG. 1 further shows a large shavings-collecting chamber 65 which is provided in the bed 1 in the region below the work-supporting ends of the spindles 5 and the slides. Rapid evacuation of shavings from the chamber 65 can be effected by a suitable conveyor 66. Since the work- and tool-accommodating space S (to the right of the headstock 2 as viewed in FIG. 1) is rather large and is fully open from the front side of the fram F (facing the viewer of FIG. 1) as well as from below (toward the chamber 65), the mounting or removal of special attachments, insertion or removal of tools or their holders, as well as interchange, mounting or removal of slides and the feed and evacuation of workpieces present no problems. Moreover, the machine tool may carry an exceptionally large number of special attachments and/or slides without the danger of interference. Each attachment can receive motion through the intermediary of a relatively short and hence light power train so that the inertia of moving parts is relatively small.

In heretofore known multiple-spindle machine tools, the cross slides and top slides normally receive motion through several levers, bars, push rods, links and like devices. In my improved machine, the control shaft 19 can transmit torque to the secondary camshafts 24 which move the cross slides back and forth by means of simple, lightweight and exchangeable cams 25 so that the means which drive the cross slides can change direction very rapidly and can be quickly decelerated to zero speed or accelerated to a high speed without excessive wear, noise and/or vibration. Since a large part of the drive for the work spindles 5 is accommodated directly in the portion 4 of the headstock 2, the power train between the prime mover 6 and the work spindles 5 is very short. This power train also drives the control shaft 19 and can be utilized to operate the indexing mechanism for the spindle carrier 3. The end portions of auxiliary shafts 28, 32, 38 extend into the tool- and work-accommodating space S so that they can be rapidly coupled to or uncoupled from special attachments which might be needed in connection with certain types of treatment. Such attachments may include end-working atachments, threading attachments, high-speed drilling attachments, cross-milling or cross-drilling attachments, reaming attachments and/or others.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a multiple-spindle machine tool, a combination comprising a frame comprising a bed, a headstock extending upwardly from said bed, an overhanging portion including an arm carried by said headstock, and a block detachable from and extending downwardly from the free end of said arm opposite said headstock, said frame having a front side and defining a work- and tool-accommodating space disposed between said headstock and said block below said overhanging portion, said space being fully accessible from the front side of said frame and being open toward said bed and said headstock having a side adjacent to said space; an indexible spindle carrier mounted in said headstock for rotation about a horizontal axis; a plurality of work spindles rotatably mounted in said carrier and having work-supporting ends located at said side of said headstock; a horizontal control shaft rotatably mounted in said overhanging portion; a guide extending across said space and having ends journalled in said headstock and said block; and a main tool slide reciprocably supported by said guide for movement toward and away from said carrier.

2. A combination as defined in claim 1, further comprising a second control shaft extending transversely of said first mentioned control shaft and a transmission for driving said second control shaft in response to rotation of said first mentioned control shaft, said second control shaft and said transmission being supported by said block.

3. In a multiple-spindle machine tool, a combination comprising a frame including a support having an upper part, an overhanging portion extending from said upper part, and a bearing portion remote from said support, said bearing portion being supported only by said overhanging portion and extending downwardly therefrom, said portions and said support defining a work- and tool-accommodating space which is open from below and at least one of said portions being provided with attachment-supporting means; and indexible carrier mounted in said support for rotation about a substantially horizontal axis; a plurality of work spindles rotatably mounted in said carrier and having work-supporting means adjacent to said space; an elongated guide extending across said space substantially axially of said carrier and having ends mounted in said support and said bearing portion; a main tool slide mounted on and movable along said guide; and a driven rotary control shaft mounted in said overhanging portion.

4. A combination as defined in claim 3, further comprising at least one attachment including a second driven control shaft rotatably suported by said bearing portion and extending transversely of said first mentioned control shaft.

5. A combination as defined in claim 3, further comprising at least one cross slide movably mounted on said overhanging portion and drive means for said cross slide, said drive means receiving motion directly from said control shaft.

6. A combination as defined in claim 5, wherein said drive means comprises cam means on said control shaft, a lever rockably mounted in said frame and having a first arm provided with follower means tracking said cam means and a second arm provided with a gear, and a rack provided on said cross slide and meshing with said gear.

7. A combination as defined in claim 6, wherein said cam means comprises a face cam having an endless cam groove for said follower means.

8. A combination as defined in claim 3, wherein said guide is hollow and further comprising main drive shaft means coaxial with and mounted in said carrier, auxiliary shaft means rotatably mounted in said guide and receiving torque from said main drive shaft means, and an attachment supported by said bearing portion and having input means receiving motion from said auxiliary shaft means.

9. A combination as defined in claim 8, wherein one of said shaft means is provided with external splines and the other shaft means includes internal splines engaging said external splines to transmit torque to said auxiliary shaft means and further comprising gear means for transmitting torque from said auxiliary shaft means to said input means.

References Cited

UNITED STATES PATENTS

| | | | |
|---|---|---|---|
| 2,236,440 | 3/1941 | Miller | 82—3 XR |
| 3,158,053 | 11/1964 | Lange | 82—3 |
| 3,344,694 | 10/1967 | White | 82—3 |

FOREIGN PATENTS

| | | |
|---|---|---|
| 1,491,046 | 6/1967 | France. |
| 997,533 | 7/1965 | Great Britain. |

LEONIDAS VLACHOS, Primary Examiner